(12) United States Patent
Ashkar et al.

(10) Patent No.: US 10,558,489 B2
(45) Date of Patent: Feb. 11, 2020

(54) SUSPEND AND RESTORE PROCESSOR OPERATIONS

(71) Applicant: Advanced Micro Devices, Inc., Sunnyvale, CA (US)

(72) Inventors: Alexander Fuad Ashkar, Winter Park, FL (US); Michael J. Mantor, Orlando, FL (US); Randy Wayne Ramsey, Oviedo, FL (US); Rex Eldon McCrary, Oviedo, FL (US); Harry J. Wise, Chuluota, FL (US)

(73) Assignee: Advanced Micro Devices, Inc., Santa Clara, CA (US)

( * ) Notice: Subject to any disclaimer, the term of this patent is extended or adjusted under 35 U.S.C. 154(b) by 213 days.

(21) Appl. No.: 15/438,466

(22) Filed: Feb. 21, 2017

(65) Prior Publication Data

US 2018/0239635 A1    Aug. 23, 2018

(51) Int. Cl.
*G06F 9/48*    (2006.01)
*G06F 9/46*    (2006.01)

(52) U.S. Cl.
CPC .............. *G06F 9/485* (2013.01); *G06F 9/461* (2013.01); *G06F 9/4881* (2013.01)

(58) Field of Classification Search
CPC .............................................. G06F 9/461–463
See application file for complete search history.

(56) References Cited

U.S. PATENT DOCUMENTS

| | | |
|---|---|---|
| 5,555,414 A | 9/1996 | Hough et al. |
| 5,826,084 A | 10/1998 | Brooks et al. |
| 6,785,886 B1 | 8/2004 | Lim et al. |
| 7,937,700 B1 | 5/2011 | Klaiber et al. |
| 8,108,879 B1 * | 1/2012 | Garlick ................... G06F 9/52 712/43 |
| 2003/0217250 A1 | 11/2003 | Bennett et al. |

(Continued)

OTHER PUBLICATIONS

LaPerm: Locality Aware Scheduler for Dynamic Parallelism on GPUs Jin Wang, Norm Rubin, Albert Sidelnik, Sudhakar Yalamanchili (Year: 2016).*

(Continued)

*Primary Examiner* — Emerson C Puente
*Assistant Examiner* — Paul V Mills
(74) *Attorney, Agent, or Firm* — Meyertons Hood Kivlin Kowert and Goetzel PC; Rory D. Rankin

(57) ABSTRACT

Systems, apparatuses, and methods for suspending and restoring operations on a processor are disclosed. In one embodiment, a processor includes at least a control unit, multiple execution units, and multiple work creation units. In response to detecting a request to suspend a software application executing on the processor, the control unit sends requests to the plurality of work creation units to stop creating new work. The control unit waits until receiving acknowledgements from the work creation units prior to initiating a suspend operation. Once all work creation units have acknowledged that they have stopped creating new work, the control unit initiates the suspend operation. Also, when a restore operation is initiated, the control unit prevents any work creation units from launching new work-items until all previously in-flight work-items have been restored to the same work creation units and execution units to which they were previously allocated.

20 Claims, 6 Drawing Sheets

(56) References Cited

U.S. PATENT DOCUMENTS

| | | | |
|---|---|---|---|
| 2004/0117532 A1 | 6/2004 | Bennett et al. | |
| 2005/0198633 A1 | 9/2005 | Lantz et al. | |
| 2007/0103476 A1* | 5/2007 | Huang | G06T 15/005 345/522 |
| 2008/0136829 A1* | 6/2008 | Su | G09G 5/363 345/520 |
| 2011/0219221 A1* | 9/2011 | Skadron | G06F 9/3851 712/235 |
| 2013/0117760 A1* | 5/2013 | Cuadra | G06F 9/3846 718/108 |
| 2014/0165072 A1* | 6/2014 | Wang | G06F 9/5016 718/104 |
| 2014/0184617 A1* | 7/2014 | Palmer | G06T 1/20 345/506 |
| 2015/0363903 A1* | 12/2015 | Orr | G06T 1/20 345/522 |

OTHER PUBLICATIONS

Enabling Preemptive Multiprogramming on GPUs Ivan Tanasic, Isaac Gelado, Javier Cabezas, Alex Ramirez, Nacho Navarro, Mateo Valero (Year: 2014).*

Implementing an efficient method of check-pointing on CPU-GPU Harsha Sutaone, Sharath Prasad and Sumanth Suraneni (Year: 2014)*

Affinity-Aware Checkpoint Restart Ajay Saini, Arash Rezaei, Frank Mueller, Paul Hargrove, Eric Roman (Year: 2014).*

Introduction to AMD GPU Programming With HIP Damon McDougall, Chip Freitag, Joe Greathouse, Nicholas Malaya, Noah Wolfe, et al. (Year: 2019).*

Turley, James L., "Chapter 9: 8086 Emulation", Advanced 80386 Programming Techniques, 1988, pp. 283-315, Osborne McGraw-Hill, Berkeley, CA, USA.

Gum, P.H., "System/370 Extended Architecture: Facilities for Virtual Machines", IBM Journal of Research and Development, Nov. 1983, pp. 530-544, vol. 27, No. 6.

* cited by examiner

Stored State 360A

| Work-Item ID | Queue ID | Entry ID | Exec Unit ID | Status | ... |
|---|---|---|---|---|---|
| 325A | 320A | 1 | 350A | Queued | |
| 325B | 320A | 2 | 350A | Queued | |
| 325C | 320A | 3 | 350A | Queued | |
| 325D | 320A | 4 | 350A | Launched | |
| 330A | 320B | 1 | 350B | Queued | |
| 330B | 320B | 2 | 350B | Launched | |
| 335A | 320C | 1 | 350C | Queued | |
| 335B | 320C | 2 | 350C | Queued | |
| 335C | 320C | 3 | 350C | Launched | |
| ⋮ | ⋮ | ⋮ | ⋮ | ⋮ | ⋮ |

*FIG. 4*

SUSPEND AND RESTORE PROCESSOR OPERATIONS

BACKGROUND

Description of the Related Art

A graphics processing unit (GPU) is a complex integrated circuit that is configured to perform graphics-processing tasks. For example, a GPU can execute graphics-processing tasks required by an end-user application, such as a video-game application. GPUs are also increasingly being used to perform other tasks which are unrelated to graphics. The GPU can be a discrete device or can be included in the same device as another processor, such as a central processing unit (CPU).

In many applications, such as graphics processing in a GPU, a sequence of work-items, which can also be referred to as threads, are processed so as to output a final result. In many modern parallel processors, for example, processors within a single instruction multiple data (SIMD) core synchronously execute a set of work-items. Typically, the synchronous executing of work-items are identical (i.e., have the identical code base). A plurality of identical synchronous work-items that are processed by separate processors are referred to as a wavefront or warp.

During processing, one or more SIMD cores concurrently execute multiple wavefronts. Execution of the wavefront terminates when all work-items within the wavefront complete processing. Each wavefront includes multiple work-items that are processed in parallel, using the same set of instructions. Generally, the time required for each work-item to complete processing depends on a criterion determined by data within the work-item. As such, the work-items with the wavefront can complete processing at different times. When a user requests to suspend operation of the physical machine which includes the GPU, there are typically many in-flight operations executing on the GPU. Determining how to suspend operations on the GPU to enable a seamless restoration can be challenging. Accordingly, improved techniques for implementing suspend and restore operations on a processor are desired.

BRIEF DESCRIPTION OF THE DRAWINGS

The advantages of the methods and mechanisms described herein may be better understood by referring to the following description in conjunction with the accompanying drawings, in which:

FIG. 4 illustrates one embodiment of a stored state.

DETAILED DESCRIPTION OF EMBODIMENTS

Figure 1:
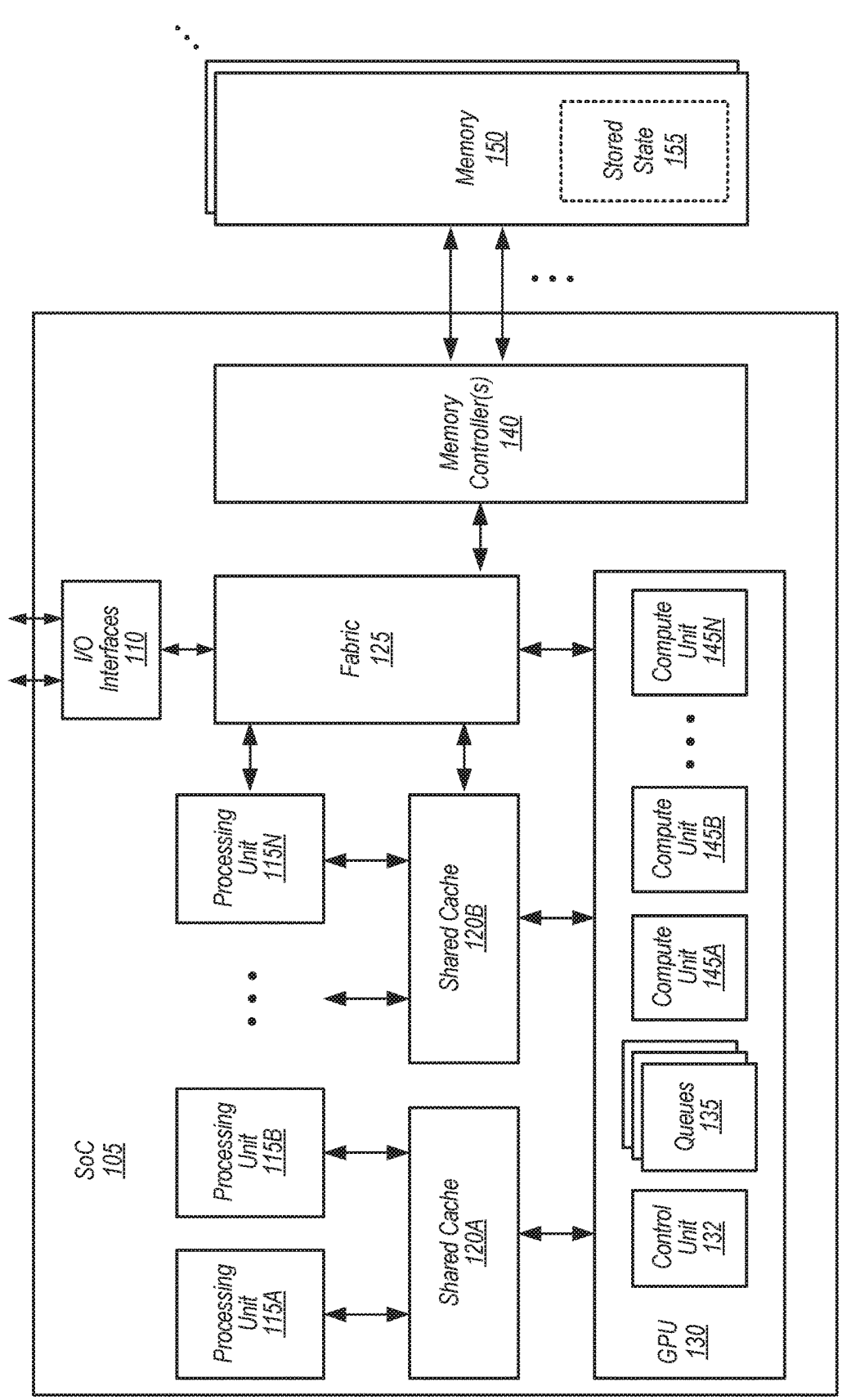
FIG. 1 is a block diagram of one embodiment of a computing system.

In the following description, numerous specific details are set forth to provide a thorough understanding of the methods and mechanisms presented herein. However, one having ordinary skill in the art should recognize that the various embodiments may be practiced without these specific details. In some instances, well-known structures, components, signals, computer program instructions, and techniques have not been shown in detail to avoid obscuring the approaches described herein. It will be appreciated that for simplicity and clarity of illustration, elements shown in the figures have not necessarily been drawn to scale. For example, the dimensions of some of the elements may be exaggerated relative to other elements.

Various systems, apparatuses, methods, and computer-readable mediums for suspending and restoring operations on a processor are disclosed. In one embodiment, a processor includes at least a plurality of execution units, a plurality of work creation units, and a control unit coupled to the plurality of execution units and the plurality of work creation units. In one embodiment, in response to detecting a request to suspend a software application executing on the processor, the control unit is configured to send requests to the plurality of work creation units to stop creating new work. The control unit waits until receiving acknowledgements in response to the requests from the plurality of work creation units prior to initiating a suspend operation. Once all work creation units have acknowledged that they will stop creating new work, the control unit initiates the suspend operation.

In one embodiment, initiating the suspend operation involves determining which work-items are in-flight, determining which work creation units initiated the work-items, determining which execution units have been allocated for the in-flight work-items, and storing status information about the in-flight work items and corresponding execution units. The status information includes which work-items are in-flight, identifiers (IDs) of work creation units that initiated the work-items, IDs of the execution units that have been allocated for the in-flight work-items, and additional information. In another embodiment, initiating the suspend operation includes one or more other steps. In one embodiment, the work creation units are threads of the application and queues, and the execution units are single instruction, multiple data (SIMD) units.

At a later point in time, the control unit receives a request to restore a previously suspended state of the processor. In one embodiment, in response to receiving the request, the control unit empties the work creation units and causes the work creation units to be idle prior to starting a restore operation. The control unit also retrieves stored information, corresponding to the previously suspended state, about in-flight work items and corresponding work creation units and execution units. Also, prior to restoring in-flight work-items to each work creation unit, the control unit prevents the plurality of work creation units from launching new work-items. Then, the control unit restores in-flight work items to each work creation unit and corresponding execution units. In one embodiment, each work-item is restored to a same work creation unit and/or a same execution unit on which the work-item was executing when the suspend operation occurred. Once the restoration of all in-flight work items has been completed to the work creation units and execution units, the control unit allows the plurality of work creation units to start launching new work-items.

Referring now to FIG. 1, a block diagram of one embodiment of a computing system 100 is shown. In one embodiment, computing system 100 includes system on chip (SoC) 105 coupled to memory 150. SoC 105 can also be referred to as an integrated circuit (IC). In one embodiment, SoC 105 includes processing units 115A-N, input/output (I/O) interfaces 110, shared caches 120A-B, fabric 125, graphics processing unit (GPU) 130, and memory controller(s) 140. SoC 105 can also include other components not shown in FIG. 1 to avoid obscuring the figure. Processing units 115A-N are representative of any number and type of processing units. In one embodiment, processing units 115A-N are central processing unit (CPU) cores. In another embodiment, one or more of processing units 115A-N are other types of processing units (e.g., application specific integrated circuit (ASIC), field programmable gate array (FPGA), digital signal processor (DSP)). Processing units 115A-N are coupled to shared caches 120A-B and fabric 125.

In one embodiment, processing units 115A-N are configured to execute instructions of a particular instruction set architecture (ISA). Each processing unit 115A-N includes one or more execution units, cache memories, schedulers, branch prediction circuits, and so forth. In one embodiment, the processing units 115A-N are configured to execute the main control software of system 100, such as an operating system. Generally, software executed by processing units 115A-N during use can control the other components of system 100 to realize the desired functionality of system 100. Processing units 115A-N can also execute other software, such as application programs.

GPU 130 includes at least control unit 132, queues 135, and compute units 145A-N which are representative of any number and type of compute units that are used for graphics or general-purpose processing. GPU 130 is coupled to shared caches 120A-B and fabric 125. In one embodiment, GPU 130 is configured to execute graphics pipeline operations such as draw commands, pixel operations, geometric computations, and other operations for rendering an image to a display. In another embodiment, GPU 130 is configured to execute operations unrelated to graphics. In a further embodiment, GPU 130 is configured to execute both graphics operations and non-graphics related operations.

In one embodiment, control unit 132 of GPU 130 is configured to initiate a suspend operation in response to receiving a request to suspend an application executing on GPU 130. In one embodiment, control unit 132 causes the work creation units (e.g., queues 135) to stop launching new work-items prior to initiating the suspend operation. In one embodiment, control unit 132 starts a timer prior to initiating the suspend operation and sets a grace period for work creation units to become idle based on a number of clock cycles of the timer. In another embodiment, control unit 132 waits to receive acknowledgements from all work creation units that these units have stopped creating new work. Once all work creation units have been idled, control unit 132 initiates the suspend operation to determine and record information about the in-flight work-items, the work creation units that launched the in-flight work-items, the execution units which have been allocated for the in-flight work-items, and additional status information. In one embodiment, control unit 132 stores the information as stored state 155 in memory 150. In other embodiments, control unit 132 can allocate stored state 155 in another location.

In one embodiment, control unit 132 of GPU 130 is configured to initiate a restore operation in response to receiving a request to restore a previously suspended application. In response to receiving the request, control unit 132 retrieves status information (e.g., stored state 155) corresponding to the previously suspended application. Also, control unit 132 empties and idles all queues 135 and other work creation units. Then, control unit 132 restores the in-flight work-items specified in the status information to the same queues 135 and execution units to which the work-items were previously allocated. After restoring all of the previously in-flight work-items, control unit 132 allows the work creation units to start launching new work-items. It is noted that a "restore operation" can also be referred to as a "resume operation".

I/O interfaces 110 are coupled to fabric 125, and I/O interfaces 110 are representative of any number and type of interfaces (e.g., peripheral component interconnect (PCI) bus, PCI-Extended (PCI-X), PCIE (PCI Express) bus, gigabit Ethernet (GBE) bus, universal serial bus (USB)). Various types of peripheral devices can be coupled to I/O interfaces 110. Such peripheral devices include (but are not limited to) displays, keyboards, mice, printers, scanners, joysticks or other types of game controllers, media recording devices, external storage devices, network interface cards, and so forth.

SoC 105 is coupled to memory 150, which includes one or more memory modules. Each of the memory modules includes one or more memory devices mounted thereon. In some embodiments, memory 150 includes one or more memory devices mounted on a motherboard or other carrier upon which SoC 105 is also mounted. In one embodiment, memory 150 is used to implement a random access memory (RAM) for use with SoC 105 during operation. The RAM implemented can be static RAM (SRAM), dynamic RAM (DRAM), Resistive RAM (ReRAM), Phase Change RAM (PCRAM), or any other volatile or non-volatile RAM. The type of DRAM that is used to implement memory 150 includes (but is not limited to) double data rate (DDR) DRAM, DDR2 DRAM, DDR3 DRAM, and so forth. Although not explicitly shown in FIG. 1, SoC 105 can also include one or more cache memories that are internal to the processing units 115A-N and/or compute units 145A-N. In some embodiments, SoC 105 includes shared caches 120A-B that are utilized by processing units 115A-N and compute units 145A-N. In one embodiment, caches 120A-B are part of a cache subsystem including a cache controller.

In various embodiments, computing system 100 can be a computer, laptop, mobile device, server or any of various other types of computing systems or devices. It is noted that the number of components of computing system 100 and/or SoC 105 can vary from embodiment to embodiment. There can be more or fewer of each component/subcomponent than the number shown in FIG. 1. For example, in another embodiment, SoC 105 can include multiple memory controllers coupled to multiple memories. It is also noted that computing system 100 and/or SoC 105 can include other components not shown in FIG. 1. Additionally, in other embodiments, computing system 100 and SoC 105 can be structured in other ways than shown in FIG. 1.

Figure 2:
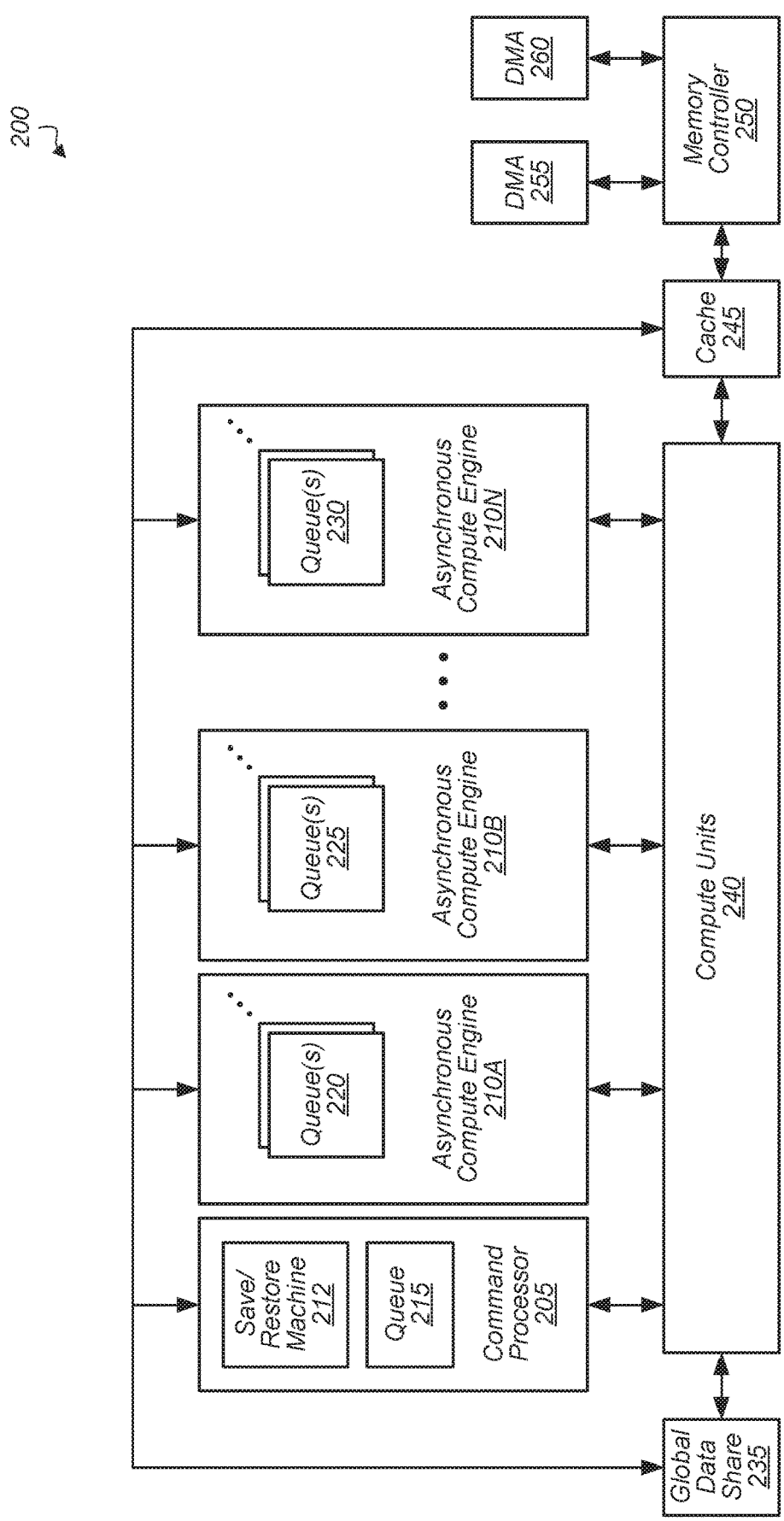
FIG. 2 is a block diagram of one embodiment of a GPU.

Turning now to FIG. 2, a block diagram of one embodiment of a graphics processing unit (GPU) 200 is shown. GPU 200 includes command processor 205, asynchronous compute engines (ACEs) 210A-N, compute units 240, cache 245, memory controller 250, and direct memory access (DMA) engines 255 and 260. It is noted that GPU 200 also includes other logic and/or other components which are not shown in FIG. 2 to avoid obscuring the figure. It is also noted that the structure of GPU 200 is merely one example of a structure which is used in one embodiment. In other embodiments, GPU 200 can be organized in other manners.

In one embodiment, the command processor 205 also includes a save/restore machine 212. In one embodiment, the save/restore machine 212 is (or effectively implements) a finite state machine which is triggered and managed by firmware and/or microcode. When operations are suspended on GPU 200, status information associated with the in-flight work-items is saved to memory by save/restore machine 212. Data associated with the in-flight work items is streamed from different units of GPU 200 to save/restore machine 212, and restore information identifying where the data came from is embedded alongside the data. For example, each piece of data sent to save/restore machine 212 is tagged to indicate which unit generated the piece of data. In one embodiment, data is streamed over a common bus to save/restore machine 212, and save/restore machine 212 uses the embedded tags to determine which unit(s) generated each piece of data. Save/restore machine 212 saves the status information and embedded tags to memory, and this stored data will be used later if a restore operation is requested. This restore information will be used by the save/restore machine 212 to redirect the saved data in memory back to the original source in response to a restore operation being launched.

In one embodiment, GPU 200 includes a plurality of queues for storing multiple work-items. For example, command processor 205 includes queue 215, ACE 210A includes queues 220, ACE 210B includes queues 225, and ACE 210N includes queues 230. Queues 220, 225, and 230 are representative of any number and type of queues, with each queue including storage elements for storing a plurality of entries. The different types of queues can include graphics queues for primary rendering tasks, compute queues for supporting GPU tasks, copy queues for data transfers, and/or other types of queues.

ACEs 210A-N are representative of any number of asynchronous compute engines which are included in GPU 200. In one embodiment, ACEs 210A-N are configured to parse incoming commands and dispatch work to the processing elements in compute units 240. The processing elements in compute units 240 can also be referred to as "execution units". In one embodiment, command processor 205 handles graphics tasks, ACEs 210A-N handle compute tasks, and DMA engines 255 and 260 handle data transfer tasks. Each queue in GPU 200 is able to dispatch work items without waiting for other tasks to complete, allowing independent command streams to be interleaved in compute units 240 and execute simultaneously.

Figure 3:
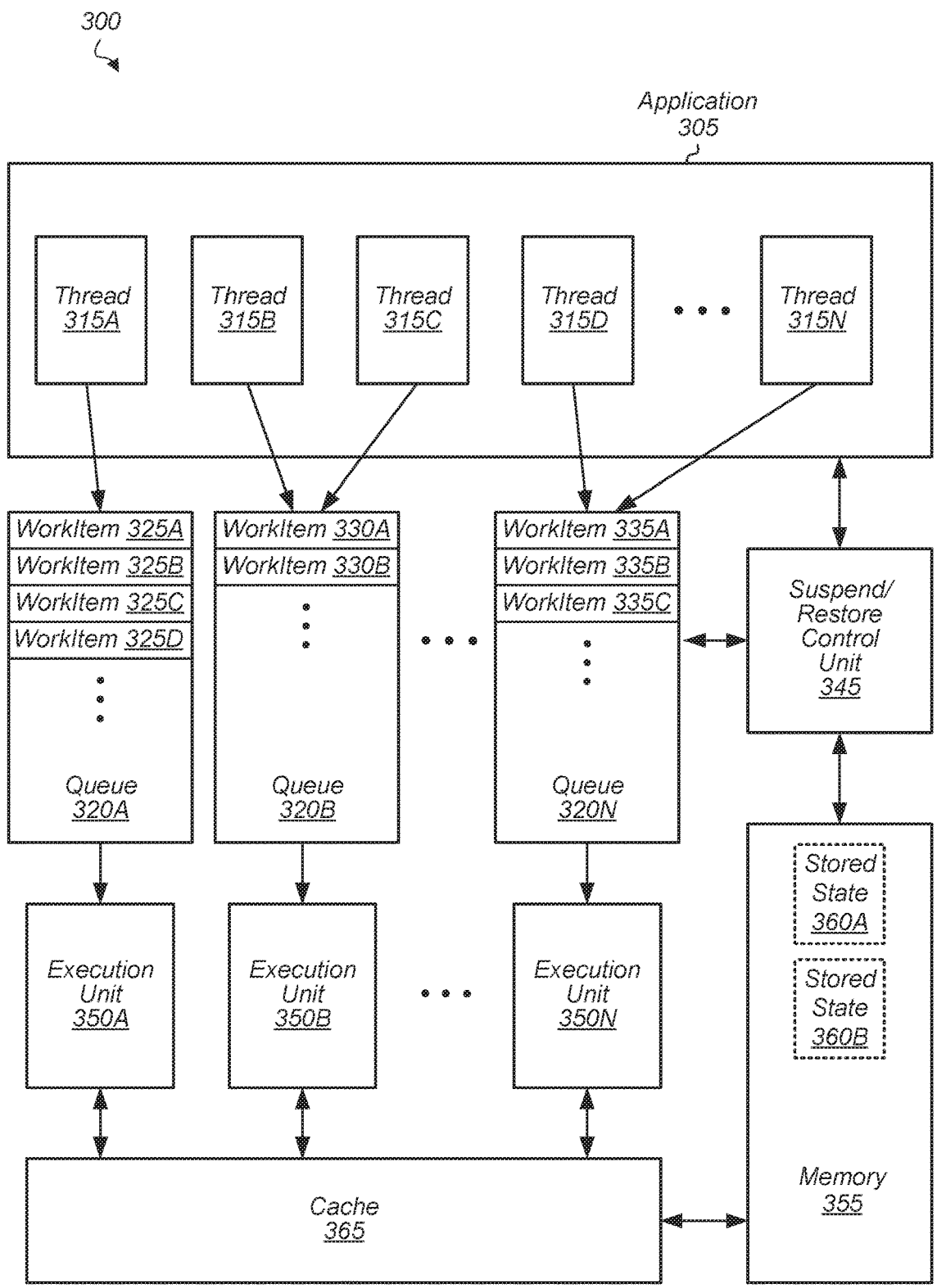
FIG. 3 is a block diagram of one embodiment of a parallel processing environment.

Referring now to FIG. 3, a block diagram of one embodiment of a parallel processing environment 300. In one embodiment, parallel processing environment 300 includes a GPU. In other embodiments, parallel processing environment 300 includes other types of processors (e.g., digital signal processor (DSP), field programmable gate array (FPGA), application specific integrated circuit (ASIC), multi-core processor). Application 305 is representative of any number and type of software applications that are executing in parallel processing environment 300. In one embodiment, application 305 is a multi-threaded application, with application 305 including threads 315A-N, which are representative of any number of threads.

Suspend/restore control unit 345 includes logic for suspending and restoring the state of the processor. In one embodiment, suspend/restore control unit 345 includes a save/restore machine (e.g., save/restore machine 212 of FIG. 2). Depending on the embodiment, suspend/restore control unit 345 can suspend and restore the state of the entire processor or suspend/restore control unit 345 can suspend and restore the state of a portion of the processor. Suspend/restore control unit 345 is implemented using any suitable combination of software and/or hardware, depending on the embodiment. In one embodiment, suspend/restore control unit 345 will receive streamed data from various parts of the processor that manage work-items, and restore information will be embedded with the streamed data indicating where the work-items came from in the processor. Suspend/restore control unit 345 will save this data to memory, and this saved data will be used later if a restore operation is requested. The saved data will be used by the suspend/restore control unit 345 to redirect the saved data from memory back to the original source in response to a restore operation being launched.

When suspend/restore control unit 345 detects a suspend request, suspend/restore control unit 345 prevents new work from being generated by the work creation units (e.g., threads 315A-N, queues 320A-N). In one embodiment, suspend/restore control unit 345 generates a request for application 305 to stop sending new work to queues 320A-N. In one embodiment, suspend/restore control unit 345 also generates requests for queues 320A-N to stop sending new work-items to execution units 350A-N. Once suspend/restore control unit 345 has received acknowledgments from application 305 and/or queues 320A-N that the launching of new work has been suspended, then suspend/restore control unit 345 starts to store the status of queues 320A-N and execution units 350A-N. The status includes information about work-items 325A-D assigned to queue 320A, work-items 330A-B assigned to queue 320B, work-items 335A-C assigned to queue 320N, etc. In one embodiment, suspend/restore control unit 345 stores status information corresponding to the suspended state of the processor in memory 355. For example, memory 355 includes stored states 360A-B, which are representative of any number of stored states that can be stored in memory 355. In other embodiments, suspend/restore control unit 345 stores the state of the processor in other locations.

As suspend/restore control unit 345 is storing the state of the processor, work can continue to be executed and completed by execution units 350A-N. However, no new work will be launched after the start of the suspension process. Finally, once suspend/restore control unit 345 finishes storing the state of the processor, then the suspension operation terminates, and the processor can shutdown, switch to executing another application, or perform another action.

At a later point of time, suspend/restore control unit 345 detects a request to restore one of the stored states 360A-B. In response to detecting the request to restore one of the stored states 360A-B, suspend/restore control unit 345 retrieves the work-item information from memory 355 and uses this information to restore work-items to queues 320A-N. Suspend/restore control unit 345 also prevents threads 315A-N and queues 320A-N from launching new work-items while the restore operation is being implemented. Suspend/restore control unit 345 also retrieves information regarding the states of execution units 350A-N and uses this information to restore the states of execution units 350A-N to the state they were in at the time of the suspend operation. Once all of the work-items have been restored to their previous state, then suspend/restore control unit 345 allows threads 315A-N and queues 320A-N to start launching new work-items.

It is noted that the letter "N" when displayed herein next to various structures is meant to generically indicate any number of elements for that structure (e.g., any number of queues 320A-N). Additionally, different references within FIG. 3 that use the letter "N" (e.g., queues 320A-N and threads 315A-N) are not intended to indicate that equal numbers of the different elements are provided (e.g., the number of queues 320A-N can differ from the number of threads 315A-N).

Turning now to FIG. 4, one embodiment of a stored state 360A is shown. It can be assumed for the purposes of this discussion that stored state 360A includes the state of the processor (of FIG. 3) as shown in FIG. 3. In one embodiment, stored state 360A includes information associated with each work-item which was stored in queues 320A-C. In one embodiment, this information includes work-item identifiers (IDs), queue IDs, queue entry IDs, execution unit IDs, status, and/or one or more other fields. In one embodiment, the status information includes an indication on whether the work-item has launched yet. In other embodiments, the status information can also include other information, such as the contents of one or more general purpose registers (GPRs), the contents of a local data share (LDS), a wave state, etc. It should be understood that the information shown in stored state 360A is indicative of one embodiment. In other embodiments, other information can be included in the stored state 360A which represents the state of the processor at the time when operation was suspended.

Figure 5:
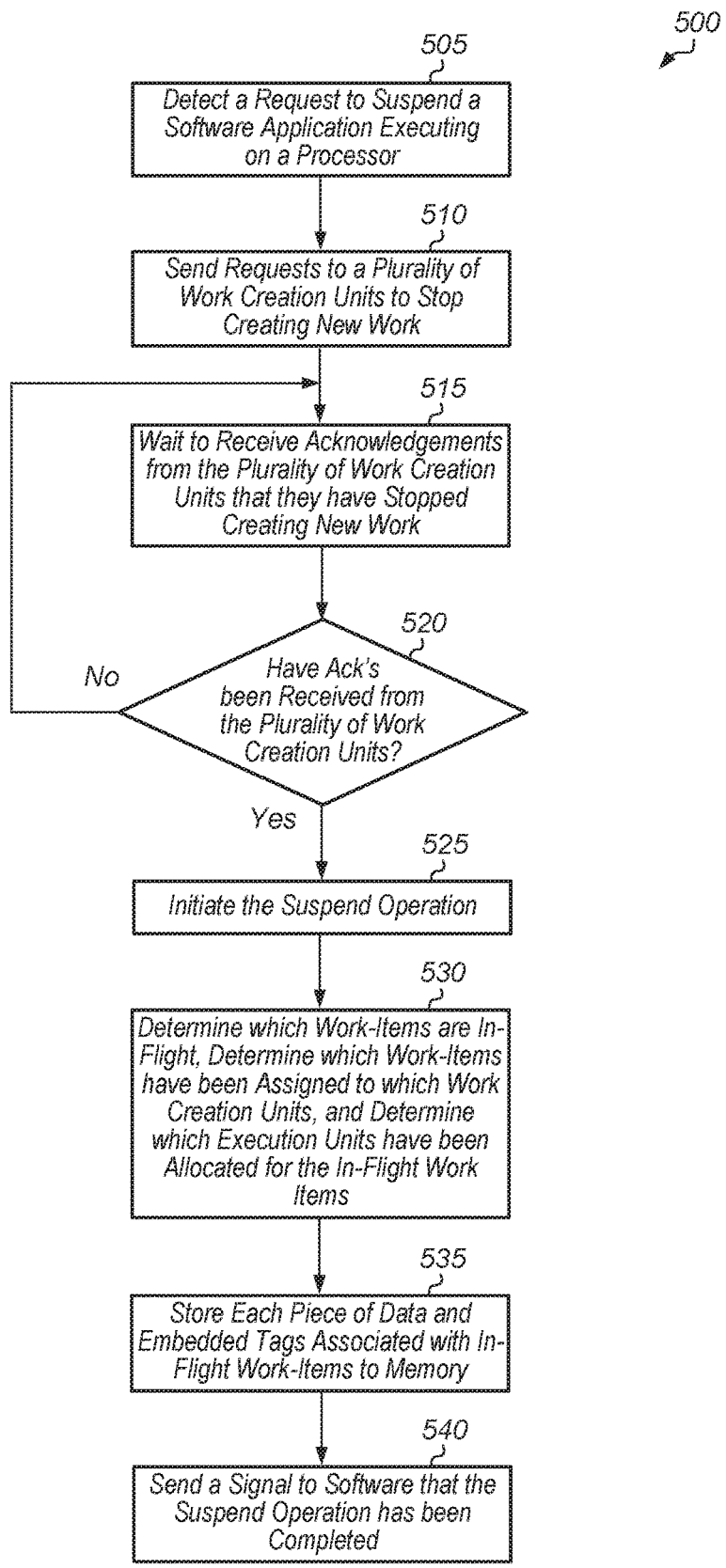
FIG. 5 is a generalized flow diagram illustrating one embodiment of a method for performing a suspend operation of in-flight work-items on a processor.
Figure 6:
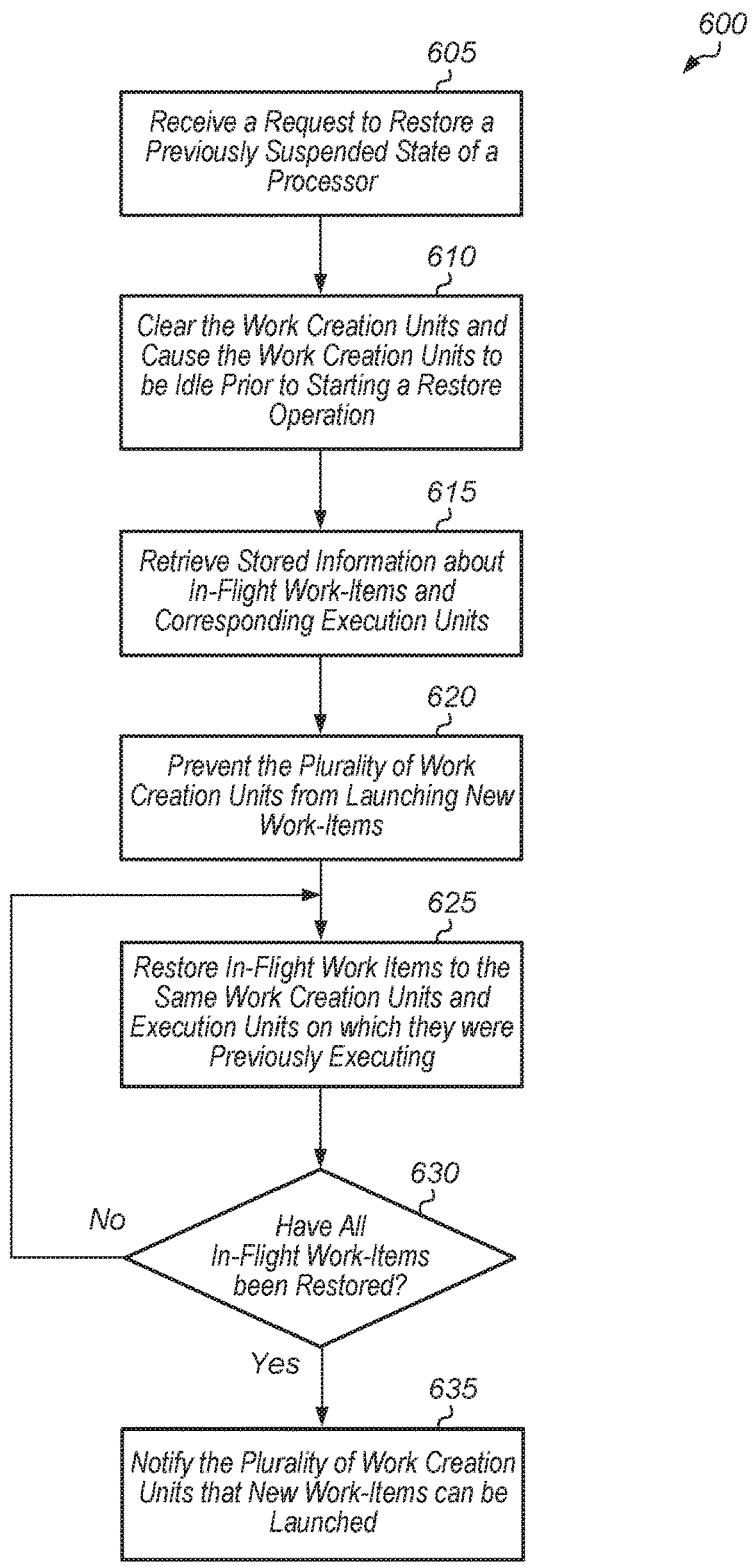
FIG. 6 is a generalized flow diagram illustrating one embodiment of a method for performing a restore operation for a previously suspended processor state.

Referring now to FIG. 5, one embodiment of a method 500 for performing a suspend operation of in-flight work-items on a processor is shown. For purposes of discussion, the steps in this embodiment and those of FIG. 6 are shown in sequential order. However, it is noted that in various embodiments of the described methods, one or more of the elements described are performed concurrently, in a different order than shown, or are omitted entirely. Other additional elements are also performed as desired. Any of the various systems, apparatuses, or computing devices described herein are configured to implement method 500.

A control unit (e.g., suspend/restore control unit 345 of FIG. 3) detects a request to suspend a software application executing on a processor (block 505). In one embodiment, the processor is a GPU. In other embodiments, the processor is any of various other types of processors (e.g., DSP, FPGA, ASIC, multi-core processor). Next, in response to detecting the request, the control unit sends requests to a plurality of work creation units to stop creating new work (block 510). In one embodiment, the work creation units are threads of an application, work queues of a GPU, and/or one or more other units. Then, the control unit waits to receive acknowledgements from the plurality of work creation units that they have stopped creating new work (block 515).

If acknowledgements have been received from the plurality of work creation units to indicate that they have stopped creating new work (conditional block 520, "yes" leg), then the control unit initiates the suspend operation (block 525). If acknowledgements have not been received from the plurality of work creation units to indicate that they have stopped creating new work (conditional block 520, "no" leg), then method 500 returns to block 515. After block 525, the control unit performs the suspend operation by determining which work-items are in-flight, determining which work-items have been assigned to which work creation units, and determining which execution units have been allocated for the in-flight work-items, (block 530). In one embodiment, data associated with the in-flight work-items is streamed from various parts of the processor to the control unit, and embedded with this data is additional information specifying where the data came from within the processor. Next, the control unit stores each piece of data and embedded tags associated with in-flight work-items to memory (block 535). In one embodiment, the embedded tags include at least an ID to indicate which work creation unit the work-item was assigned and/or an ID to indicate on which execution unit each in-flight work-item was executing. The control unit describes each piece of data such that a later restore operation can restore the data back to the state that existed when the suspend operation was initiated. The saved data will be used to help the control unit redirect the saved data from memory back to the original source when instructed to do so by a restore operation. Then, the control unit sends a signal to software that the suspend operation has been completed (block 540). After block 540, method 500 ends.

Turning now to FIG. 6, one embodiment of a method 600 for performing a restore operation for a previously suspended processor state is shown. A control unit receives a request to restore a previously suspended state of a processor (block 605). In response to receiving the request, the control unit clears the work creation units and causes the work creation units to be idle prior to starting a restore operation (block 610). Also, the control unit retrieves stored information about in-flight work items and corresponding execution units (block 615).

Next, the control unit prevents the plurality of work creation units from launching new work-items (block 620). In one embodiment, the control unit sends a request to each work creation unit to prevent the work creation unit from launching new work-items. Accordingly, the control unit prevents the plurality of work creation units from launching new work-items prior to restoring any in-flight work-items to each work creation unit. Then, the control unit restores in-flight work items to the same work creation units and execution units on which they were previously executing (block 625). If all of the in-flight work items have been restored to a work creation unit and/or execution unit (conditional block 630, "yes" leg), then the control unit notifies the plurality of work creation units that new work-items can be launched (block 635). After block 635, method 600 ends. If not all of the in-flight work items have been restored to a work creation unit and/or execution unit (conditional block 630, "no" leg), then method 600 returns to block 625.

In various embodiments, program instructions of a software application are used to implement the methods and/or mechanisms previously described. The program instructions describe the behavior of hardware in a high-level programming language, such as C. Alternatively, a hardware design language (HDL) is used, such as Verilog. The program instructions are stored on a non-transitory computer readable storage medium. Numerous types of storage media are available. The storage medium is accessible by a computing system during use to provide the program instructions and accompanying data to the computing system for program execution. The computing system includes at least one or more memories and one or more processors configured to execute program instructions.

It should be emphasized that the above-described embodiments are only non-limiting examples of implementations. Numerous variations and modifications will become apparent to those skilled in the art once the above disclosure is fully appreciated. It is intended that the following claims be interpreted to embrace all such variations and modifications.

What is claimed is:
1. A processor comprising:
a plurality of execution units, each configured to execute a single in-flight work item of a wavefront in parallel with another execution unit executing a separate in-flight work item of the wavefront;

a plurality of work creation units, each configured to launch a work item of the wavefront in parallel with another work creation unit launching a separate in-flight work item of the wavefront; and a control unit coupled to the plurality of execution units and the plurality of work creation units;

wherein responsive to detecting a request to suspend a software application executing on the processor, the control unit is configured to:

send requests to the plurality of work creation units to stop creating new work;

wait until receiving acknowledgements from the plurality of work creation units in response to the requests, prior to initiating a suspend operation; and initiate the suspend operation responsive to receiving acknowledgements from the plurality of work creation units, wherein initiating the suspend operation comprises storing at least identifiers of work creation units to which work items were assigned.

2. The processor as recited in claim 1, wherein the control unit is further configured to initiate the suspend operation responsive to receiving acknowledgements from the plurality of work creation units, wherein initiating the suspend operation comprises:

determining which work-items are in-flight;

determining which work-items have been assigned to which work creation units;

determining which execution units have been allocated for the in-flight work-items; and storing the identifiers of work creation units and indicators of whether work items were queued or launched as status information about the work items and corresponding execution units.

3. The processor as recited in claim 2, wherein the work creation units comprise a plurality of threads of the software application and a plurality of queues, wherein responsive to receiving a request to restore a previously suspended state of the processor, the control unit is configured to:

retrieve the stored status information, corresponding to the previously suspended state, about the work items and the corresponding execution units;

prevent the plurality of queues from launching new work items;

restore the work items to queues of the plurality of queues included in work creation units which originally sourced the data of the work-items within the processor; and responsive to completing restoration of all of the work items indicated by the stored status information to the plurality of queues, allow the plurality of queues to start launching new work-items.

4. The processor as recited in claim 3, wherein the control unit is further configured to clear the plurality of queues and cause the plurality of queues to be idle prior to starting a restore operation.

5. The processor as recited in claim 3, wherein the status information includes an identifier (ID) to identify which execution unit an in-flight work-item was executing on when the suspend operation occurred.

6. The processor as recited in claim 5, wherein each work-item is restored to a same execution unit on which the work-item was executing when the suspend operation occurred using IDs of execution units from the status information.

7. The processor as recited in claim 5, wherein the status information includes contents of one or more general purpose registers (GPRs), a local data share (LDS), and a wave state.

8. A method for use in a computing device, the method comprising:

executing work units on a plurality of execution units, each configured to execute a single in-flight work item of a wavefront in parallel with another execution unit executing a separate in-flight work item of the wavefront;

launching work items with a plurality of work creation units, each configured to launch a work item of the wavefront in parallel with another work creation unit launching a separate in-flight work item of the wavefront;

detecting a request to suspend a software application executing on a processor;

responsive to detecting the request to suspend the software application executing on the processor:

sending requests to a plurality of work creation units to stop creating new work;

waiting until receiving acknowledgements from the plurality of work creation units in response to the requests, prior to initiating a suspend operation; and initiating the suspend operation responsive to receiving acknowledgements from the plurality of work creation units, wherein initiating the suspend operation comprises storing at least identifiers of work creation units to which work items were assigned.

9. The method as recited in claim 8, further comprising initiate the suspend operation responsive to receiving acknowledgements from the plurality of work creation units, wherein initiating the suspend operation comprises:

determining which work-items are in-flight;

determining which work-items have been assigned to which work creation units;

determining which execution units have been allocated for the in-flight work-items; and storing the identifiers of work creation units and indicators of whether work items were queued or launched as status information about the in-flight work items and corresponding execution units.

10. The method as recited in claim 9, wherein the work creation units comprise a plurality of threads of the software application and a plurality of queues, wherein responsive to receiving a request to restore a previously suspended state of the processor, the method comprising:

retrieving the stored status information, corresponding to the previously suspended state, about the work items and the corresponding execution units;

preventing the plurality of queues from launching new work items;

restoring the work items to queues of the plurality of queues included in work creation units which originally sourced the data of the work-items within the processor; and responsive to completing restoration of all of the work items indicated by the stored status information to the plurality of queues, allowing the plurality of queues to start launching new work-items.

11. The method as recited in claim 10, further comprising clearing the plurality of queues and cause the plurality of queues to be idle prior to starting a restore operation.

12. The method as recited in claim 10, wherein the status information includes an identifier (ID) to identify which execution unit an in-flight work-item was executing on when the suspend operation occurred.

13. The method as recited in claim 12, further comprising restoring each work-item to a same execution unit on which the work-item was executing when the suspend operation occurred using IDs of execution units from the status information.

14. The method as recited in claim 12, wherein the status information includes contents of one or more general purpose registers (GPRs), a local data share (LDS), and a wave state.

15. A system comprising:
a memory; and
a processor comprising:
  a plurality of execution units, each configured to execute a single in-flight work item of a wavefront in parallel with another execution unit executing a separate in-flight work item of the wavefront;
  a plurality of work creation units, each configured to launch a work item of the wavefront in parallel with another work creation unit launching a separate in-flight work item of the wavefront; and
  a control unit coupled to the plurality of execution units and the plurality of work creation units;
wherein responsive to detecting a request to suspend a software application executing on the processor, the control unit is configured to:
  send requests to the plurality of work creation units to stop creating new work;
  wait until receiving acknowledgements from the plurality of work creation units in response to the requests, prior to initiating a suspend operation; and
  initiate the suspend operation responsive to receiving acknowledgements from the plurality of work creation units, wherein initiating the suspend operation comprises storing at least identifiers of work creation units to which work items were assigned.

16. The system as recited in claim 15, wherein the control unit is further configured to initiate the suspend operation responsive to receiving acknowledgements from the plurality of work creation units, wherein initiating the suspend operation comprises:
  determining which work-items are in-flight;
  determining which work-items have been assigned to which work creation units;
  determining which execution units have been allocated for the in-flight work-items; and
  storing the identifiers of work creation units and indicators of whether work items were queued or launched as status information about the in-flight work items and corresponding execution units.

17. The system as recited in claim 16, wherein the work creation units comprise a plurality of threads of the software application and a plurality of queues, wherein responsive to receiving a request to restore a previously suspended state of the processor, the control unit is configured to:
  retrieve the stored status information, corresponding to the previously suspended state, about the work items and the corresponding execution units;
  prevent the plurality of queues from launching new work items;
  restore the work items to queues of the plurality of queues included in work creation units which originally sourced the data of the work-items within the processor; and
  responsive to completing restoration of all of the work items indicated by the stored status information to the plurality of queues, allow the plurality of queues to start launching new work-items.

18. The system as recited in claim 17, wherein the control unit is further configured to empty the plurality of queues and cause the plurality of queues to be idle prior to starting a restore operation.

19. The system as recited in claim 17, wherein the status information includes an identifier (ID) to identify which execution unit an in-flight work-item was executing on when the suspend operation occurred.

20. The system as recited in claim 19, wherein each work-item is restored to a same execution unit on which the work-item was executing when the suspend operation occurred using IDs of execution units from the status information.

* * * * *